United States Patent
Ehrlich

(10) Patent No.: US 7,180,695 B2
(45) Date of Patent: *Feb. 20, 2007

(54) SYSTEMS FOR SELF-SERVOWRITING WITH MULTIPLE PASSES PER SERVOWRITING STEP

(75) Inventor: Richard M. Ehrlich, Saratoga, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/818,181

(22) Filed: Apr. 5, 2004

(65) Prior Publication Data

US 2005/0248872 A1    Nov. 10, 2005

Related U.S. Application Data

(63) Continuation of application No. 10/420,452, filed on Apr. 22, 2003, now abandoned.

(60) Provisional application No. 60/436,709, filed on Dec. 27, 2002.

(51) Int. Cl.
*G11B 21/02* (2006.01)
*G11B 5/58* (2006.01)
*G11B 5/596* (2006.01)

(52) U.S. Cl. .................. 360/75; 360/77.01; 360/78.04

(58) Field of Classification Search ..................... None
See application file for complete search history.

(56) References Cited

U.S. PATENT DOCUMENTS

| 5,107,378 A | 4/1992 | Cronch et al. ............. 360/45 |
| 5,946,157 A * | 8/1999 | Codilian et al. ............. 360/75 |
| 5,966,264 A | 10/1999 | Belser et al. ............. 360/77.08 |
| 6,023,389 A | 2/2000 | Cunningham ............. 360/75 |
| 6,025,970 A | 2/2000 | Cheung ............. 360/77.08 |
| 6,411,459 B1 | 6/2002 | Belser et al. ............. 360/75 |
| 6,445,521 B1 | 9/2002 | Schaff et al. ............. 360/31 |
| 6,493,173 B1 | 12/2002 | Kim et al. ............. 360/77.04 |
| 6,600,620 B1 * | 7/2003 | Krounbi et al. ............. 360/75 |

(Continued)

FOREIGN PATENT DOCUMENTS

JP    61211814    9/1986

(Continued)

*Primary Examiner*—Hoa Thi Nguyen
*Assistant Examiner*—Jason Olson
(74) *Attorney, Agent, or Firm*—Fliesler Meyer LLP

(57) ABSTRACT

The amount of position error written into a servo burst pattern can be reduced by using additional media revolutions to write the pattern. Where servo bursts are used to define a position on the media, trimming a first burst and writing a second burst on separate revolutions of the media will result in a different amount of position error being written into each burst. The end result will be a reduction in the overall error in position information. In order to further reduce the position error given by a combination of bursts, each burst also can be trimmed and/or written in multiple passes. The overall error in position should decrease as the number of passes used to write a burst combination increases. This description is not intended to be a complete description of, or limit the scope of, the invention. Other features, aspects, and objects of the invention can be obtained from a review of the specification, the figures, and the claims.

17 Claims, 8 Drawing Sheets

U.S. PATENT DOCUMENTS

| | | |
|---|---|---|
| 6,671,119 B2 | 12/2003 | Baumann et al. ........ 360/77.08 |
| 6,940,677 B2 | 9/2005 | Fukushima et al. ........... 360/75 |
| 6,954,325 B2 | 10/2005 | Liu et al. ..................... 360/75 |
| 2002/0135927 A1 | 9/2002 | Yatsu |
| 2003/0161061 A1 | 8/2003 | Lamberts |
| 2004/0123025 A1* | 6/2004 | Chainer et al. ............. 711/112 |
| 2005/0248872 A1* | 11/2005 | Ehrlich ....................... 360/75 |

FOREIGN PATENT DOCUMENTS

| | | |
|---|---|---|
| JP | 63025803 | 2/1988 |
| JP | 10334402 | 12/1998 |

* cited by examiner

SYSTEMS FOR SELF-SERVOWRITING WITH MULTIPLE PASSES PER SERVOWRITING STEP

CLAIM OF PRIORITY

This application is a continuation of U.S. patent application Ser. No. 10/420,452, filed Apr. 22, 2003, now abandoned which claims benefit of U.S. Provisional Patent Application No. 60/436,709, filed Dec. 27, 2002, both of which are incorporated herein by reference.

CROSS-REFERENCE TO RELATED APPLICATIONS

The following applications are cross-referenced and incorporated herein by reference:

U.S. Provisional Patent Application No. 60/436,743 entitled "Methods for Multi-Pass Self-Servowriting," by Richard M. Ehrlich, filed Dec. 27, 2002.

U.S. patent application Ser. No. 10/420,127 entitled "Methods for Self-Servowriting with Multiple Passes Per Servowriting Step," by Richard M. Ehrlich, filed Apr. 22, 2003.

U.S. patent application Ser. No. 10/818,185, entitled "Methods for Self-Servowriting With Multiple Passes Per Servowriting Step," by Richard M. Ehrlick, filed Apr. 5, 2004.

U.S. Provisional Patent Application No. 60/436,712 entitled "Systems for Self-Servowriting Using Write-Current Variation," by Richard M. Ehrlich, filed Dec. 27, 2002.

U.S. Provisional Patent Application No. 60/436,703 entitled "Methods for Self-Servowriting Using Write-Current Variation," by Richard M. Ehrlich, filed Dec. 27, 2002.

U.S. patent application Ser. No. 10/420,076 entitled "Systems for Self-Servowriting Using Write-Current Variation," by Richard M. Ehrlich, filed Apr. 22, 2003.

U.S. patent application Ser. No. 10/420,498 entitled "Methods for Self-Servowriting Using Write-Current Variation," by Richard M. Ehrlich, filed Apr. 22, 2003.

U.S. patent application Ser. No. 10/818,473, entitled "Systems for Self-Servowriting Using Write-Current Variation," by Richard M. Ehrlich, filed Apr. 5, 2004.

U.S. patent application Ser. No. 10/818,174, entitled "Methods for Self-Servowriting Using Write-Current Variation," by Richard M. Ehrlich, filed Apr. 5, 2004.

FIELD OF THE INVENTION

The present invention relates to servowriting processes and devices.

BACKGROUND

Advances in data storage technology have provided for ever-increasing storage capability in devices such as DVD-ROMs, optical drives, and disk drives. In hard disk drives, for example, the width of a written data track has decreased due in part to advances in read/write head technology, as well as in reading, writing, and positioning technologies. More narrow data tracks result in higher density drives, which is good for the consumer but creates new challenges for drive manufacturers. As the density of the data increases, the tolerance for error in the position of a drive component such as a read/write head decreases. As the position of such a head relative to a data track becomes more important, so too does the placement of information, such as servo data, that is used to determine the position of a head relative to a data track.

BRIEF SUMMARY

Systems and methods in accordance with the present invention take advantage of multiple passes in servowriting and self-servowriting applications. These additional passes allow patterns such as servo burst pairs to be written and/or trimmed on separate passes. The additional passes reduce the written runout, as the average misplacement decreases when the number of passes increases. Each burst in a servo pattern can also be written and/or trimmed in multiple passes.

Other features, aspects, and objects of the invention can be obtained from a review of the specification, the figures, and the claims.

DETAILED DESCRIPTION

Figure 1:
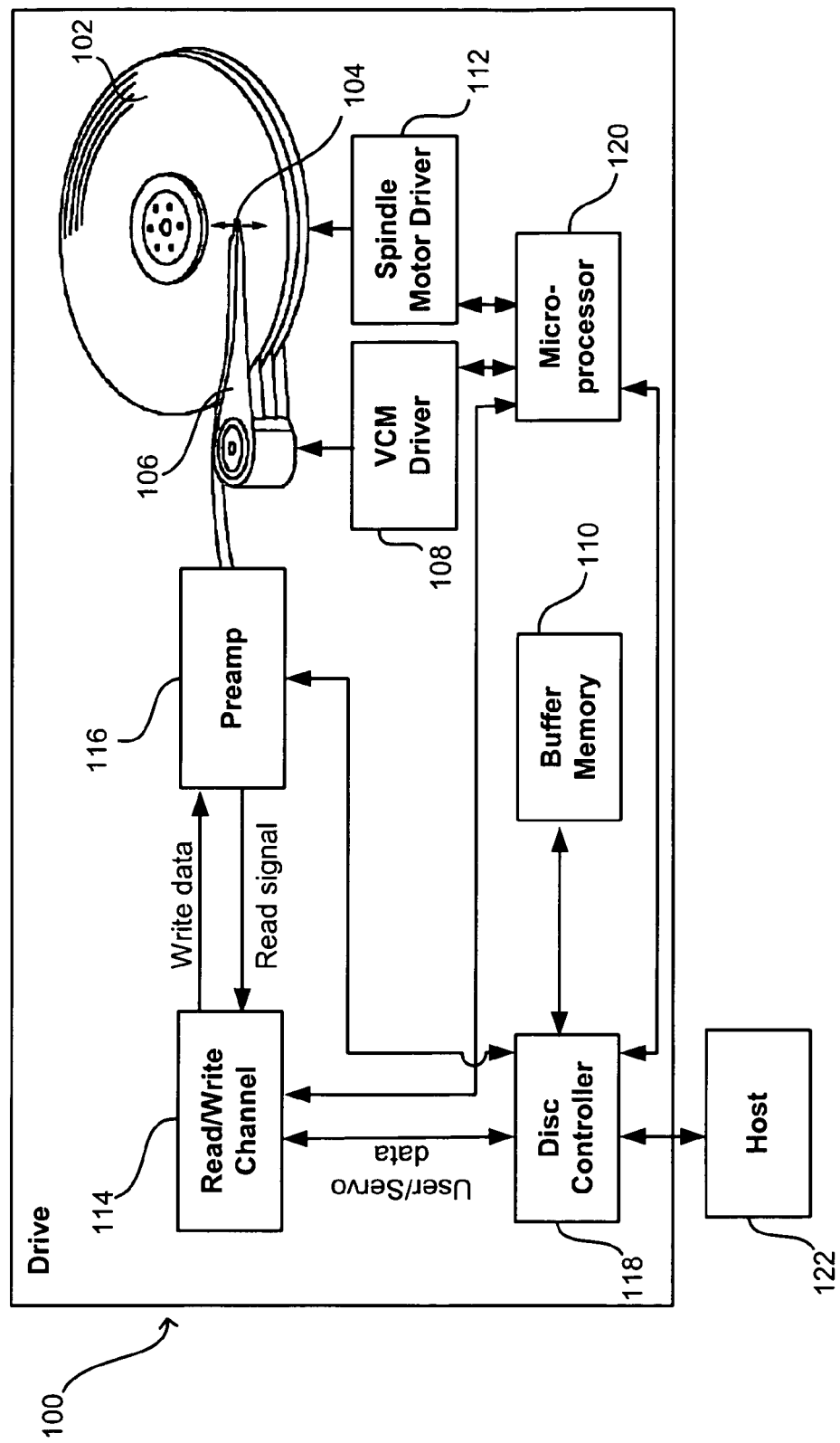
FIG. 1 is a diagram showing components of a disc drive that can be used in accordance with embodiments of the present invention.

Systems and methods in accordance with one embodiment of the present invention can be used when servowriting, or self-servowriting, a rotatable storage medium in a data storage device, such as a hard disk drive. For example, a typical disk drive 100, as shown in FIG. 1, includes at least one magnetic disk 102 capable of storing information on at least one of the surfaces of the disk. A closed-loop servo system can be used to move an actuator arm 106 and data head 104 over the surface of the disk, such that information can be written to, and read from, the surface of the disk. The closed-loop servo system can contain, for example, a voice coil motor driver 108 to drive current through a voice coil motor (not shown) in order to drive the actuator arm, a spindle motor driver 112 to drive current through a spindle motor (not shown) in order to rotate the disk(s), a microprocessor 120 to control the motors, and a disk controller 118 to transfer information between the microprocessor, buffer, read channel, and a host 122. A host can be any device, apparatus, or system capable of utilizing the data storage device, such as a personal computer or Web server. The drive can contain at least one processor, or microprocessor 120, that can process information for the disk controller 118, read/write channel 114, VCM driver 108, or spindle driver 112. The microprocessor can also include a servo controller, which can exist as an algorithm resident in the microprocessor 120. The disk controller 118, which can store information in buffer memory 110 resident in the drive, can also provide user data to a read/write channel 114, which can send data signals to a current amplifier or preamp 116 to be written to the disk(s) 102, and can send servo and/or user data signals back to the disk controller 118.

Figure 2:
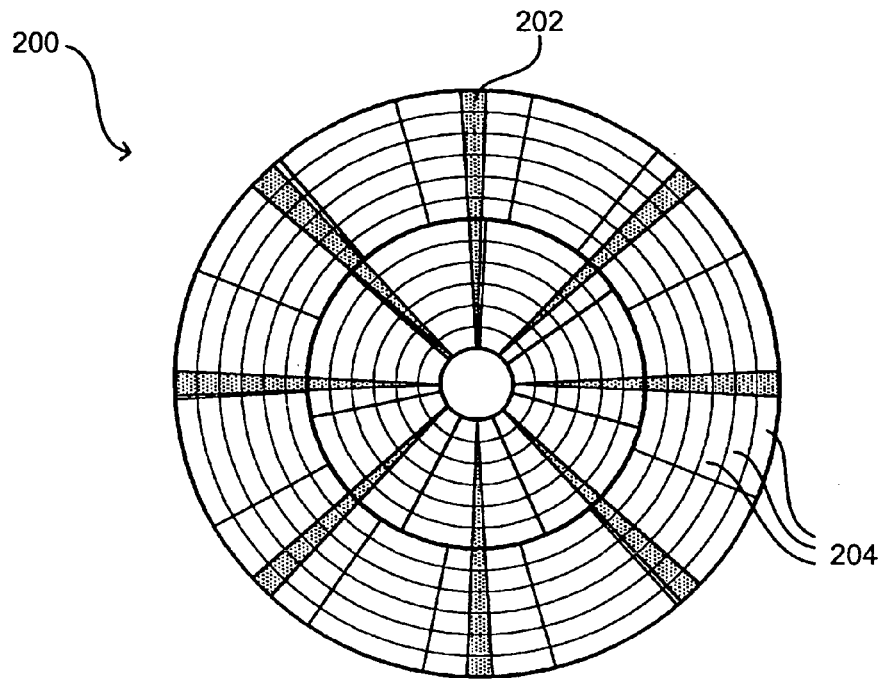
FIG. 2 is a diagram showing an example of a data and servo format for a disk in the drive of FIG. 1.

The information stored on such a disk can be written in concentric tracks, extending from near the inner diameter of the disk to near the outer diameter of the disk 200, as shown in the example disk of FIG. 2. In an embedded servo-type system, servo information can be written in servo wedges 202, and can be recorded on tracks 204 that can also contain data. In a system where the actuator arm rotates about a pivot point such as a bearing, the servo wedges may not extend linearly from the inner diameter (ID) of the disk to the outer diameter (OD), but may be curved slightly in order to adjust for the trajectory of the head as it sweeps across the disk.

The servo information often includes bursts of transitions called "servo bursts." The servo information can be positioned regularly about each track, such that when a data head reads the servo information, a relative position of the head can be determined that can be used by a servo processor to adjust the position of the head relative to the track. For each servo wedge, this relative position can be determined in one example as a function of the target location, a track number read from the servo wedge, and the amplitudes or phases of the bursts, or a subset of those bursts. The position of a head or element, such as a read/write head or element, relative to the center of a target track, will be referred to herein as a position-error signal (PES).

Figure 3:
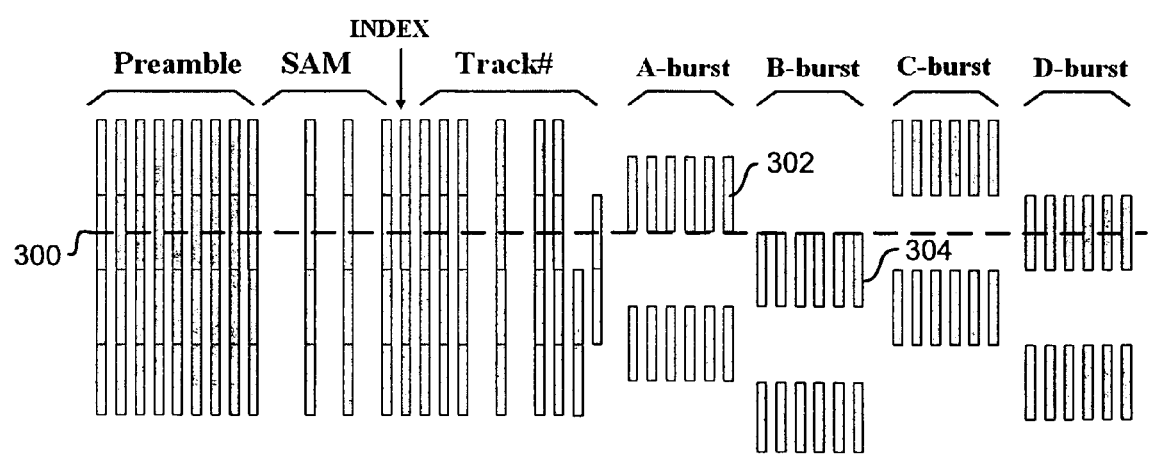
FIG. 3 is a diagram showing servo information that can be written to the tracks shown in FIG. 2.

For example, a centerline 300 for a given data track can be "defined" relative to a series of bursts, burst edges, or burst boundaries, such as a burst boundary defined by the lower edge of A-burst 302 and the upper edge of B-burst 304 in FIG. 3. The centerline can also be defined by, or offset relative to, any function or combination of bursts or burst patterns. This can include, for example, a location at which the PES value is a maximum, a minimum, or a fraction or percentage thereof. Any location relative to a function of the bursts can be selected to define track position. For example, if a read head evenly straddles an A-burst and a B-burst, or portions thereof, then servo demodulation circuitry in communication with the head can produce equal amplitude measurements for the two bursts, as the portion of the signal coming from the A-burst above the centerline is approximately equal in amplitude to the portion coming from the B-burst below the centerline. The resulting computed PES can be zero if the radial location defined by the A-burst/B-burst (A/B) combination, or A/B boundary, is the center of a data track, or a track centerline. In such an embodiment, the radial location at which the PES value is zero can be referred to as a null-point. Null-points can be used in each servo wedge to define a relative position of a track. If the head is too far towards the outer diameter of the disk, or above the centerline in FIG. 3, then there will be a greater contribution from the A-burst that results in a more "negative" PES. Using the negative PES, the servo controller could direct the voice coil motor to move the head toward the inner diameter of the disk and closer to its desired position relative to the centerline. This can be done for each set of burst edges defining the shape of that track about the disk.

The PES scheme described above is one of many possible schemes for combining the track number read from a servo wedge and the phases or amplitudes of the servo bursts. Many other schemes are possible that can benefit from embodiments in accordance with the present invention.

A problem that exists in the reading and writing of servo patterns involves the misplacement, or offset, of a read/write head with respect to the ideal and/or actual position of a track. It is impossible to perfectly position a head with respect to a track for each rotation of a disk, as there is almost always a noticeable offset between the desired position and the actual position of the head with respect to the disk. This can cause problems when writing servo patterns, as each portion of the pattern can be slightly misplaced. This can lead to what is referred to as written-in runout. Written-in runout can be thought of as the offset between the "actual" centerline, or desired radial center, of a track and the centerline that would be determined by a head reading the written servo pattern. Written-in runout can lead to servo performance problems, wasted space on a disk and, in a worst case, unrecoverable or irreparably damaged data.

Systems and methods in accordance with embodiments of the present invention overcome deficiencies in prior art servowriting and self-servowriting systems by taking advantage of additional passes when writing servo information. The use of additional passes for the writing and/or trimming of servo burst patterns, for example, can provide for a low written-in runout in a servo pattern, but at the cost of some time-penalties in the servowriting and/or self-servowriting operations. The additional passes can achieve this reduced written-in runout by effectively making the written-in runout be the average of multiple servowriting passes. The time penalty due to the additional passes is small in self-servowriting processes, since a drive typically already spends many revolutions at each servowriting position in determination of the written-in runout of the reference pattern. One or two extra revolutions will only increase the self-servowriting time by a small fraction, such as on the order of about 16%–32%. Used with a standard servowriting process, each additional pass can add on the order of 75%.

FIGS. 4(a)–4(f) depict the progression of several steps of an exemplary servowriting process. The pattern shown in these figures is commonly referred to in the trade as a 3-pass-per-track, trimmed-burst pattern, for reasons described below. However, it is to be understood that for this specification the appropriate term is "3-step-per-track" or "3-servowriting-step-per-track". That is to say that each servowriting step can include one or multiple passes and each track is defined by one or multiple servowriting steps. Each figure depicts a small portion of the surface of a disk. This portion can contain several servo tracks, extending radially on the disk and vertically in the figures, and can cover the space of a single servo wedge, circumferentially on the disk and horizontally in the figures. A typical drive can have tens of thousands of servo tracks, and over one hundred wedges per revolution. In the figures, the patterned areas indicate portions of the surface of the disk that have been magnetized in one direction. Areas without patterning have been magnetized in another direction, typically in a direction opposite to that of the patterned areas. For drives which use longitudinal recording, the first direction will be substantially in the circumferential direction, and the second direction will be opposite to the first. For drives which use perpendicular recording (also referred to as "vertical recording"), the two directions are perpendicular to the plane of the disk. These simplified figures do not show effects of side-writing of the write element, which can produce nonlongitudinal magnetization and erase bands. Such effects are not of primary importance to the discussion herein.

Figure 4A:
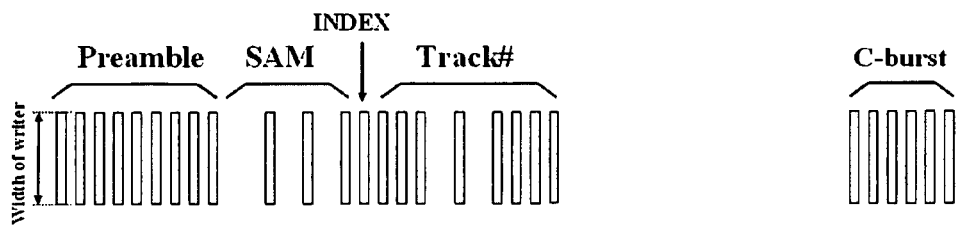
FIGS. 4(a)–(f) are diagrams of a servo-burst pattern being written over a progression of servowriting steps.

In FIG. 4(a), the result of a single servowriting step is shown. From that step, the servowriting head (passing from left to right in the figure) has written an exemplary servo pattern containing a preamble, followed by a servo-address mark (SAM), followed by an INDEX-bit, and then a track number, as is known in the art. Other information can be written to the servo pattern in addition to, or in place of, the information shown in FIG. 4(a). An INDEX-bit, for example, is one piece of information that can be used to give the servo an indication of which wedge is wedge-number zero, useful for determining circumferential position. The track number, which can be a graycoded track-number, can later be used by the servo to determine the coarse radial position of the read/write (R/W) head. Following the track number, the head writes one of four servo bursts, in this case what will be referred to as a C-burst, which can later be used by a servo to determine the fine (fractional track) radial position of a R/W head. The number of servo bursts used can vary with servo pattern. The burst that is written can be, for example, the one that is in-line with the digital information. The width of the written track can be determined by the magnetic write-width of the write element of the servowriting head.

Figure 4B:
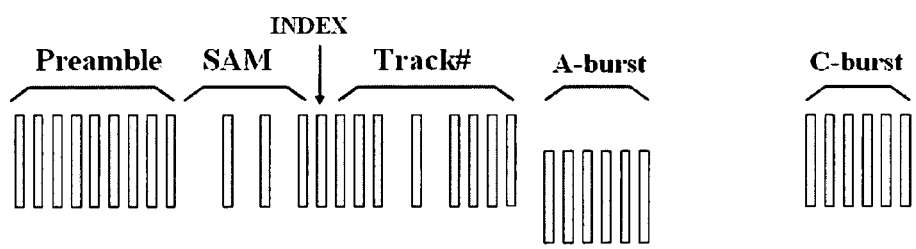

FIG. 4(b) shows the result of a second step of the servowriting process. All that has been added in the second step is an additional burst, in this case referred to as an A-burst. The A-burst is displaced longitudinally from both the digital information and the C-burst, to prevent any overlap in the longitudinal direction. The A-burst is also displaced by approximately one-half of a servo-track in the radial direction.

Figure 4C:
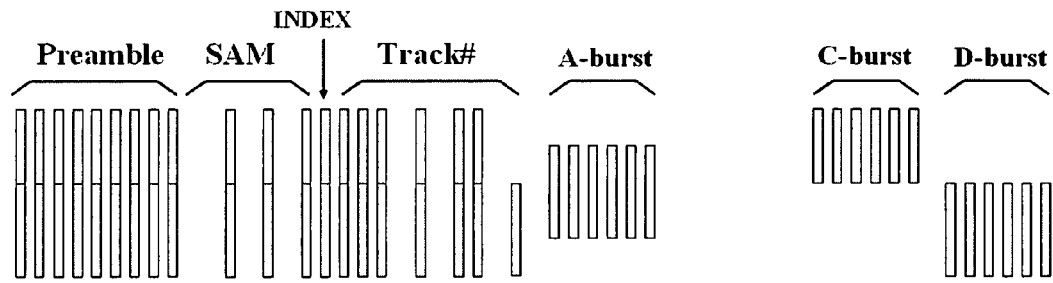

FIG. 4(c) shows the magnetization pattern after three steps of the servowriting process. The new portion of the pattern has been written with the servowriting head displaced another half servo track radially, for a total displacement of one servo-track, or two-thirds of a data-track, from the position of the head during the first servowriting step. New digital information has been written, including the same preamble, SAM, and INDEX-bit, as well as a new track number. A D-burst was added during the third servowriting step, and the C-burst was "trimmed." The C-burst was trimmed by "erasing" the portion of the C-burst under the servowriting head as the head passed over the burst on the third servowriting step. As long as the servowriting head is at least two-thirds of a data-track in radial extent, the digital information will extend across the entire radial extent of the servowritten pattern. This trimming of the C-burst and writing of the D-burst created a common edge position or "boundary" between the two bursts.

Figure 4D:
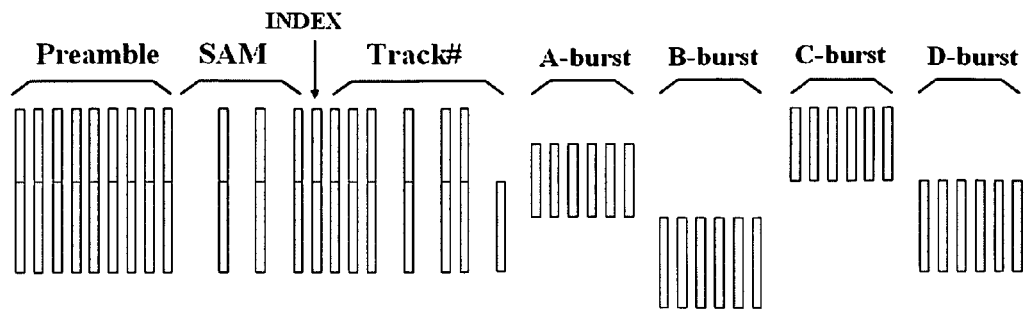

In FIG. 4(d), a B-burst has been added and the A-burst trimmed in the fourth step of the servowriting process. At a point in time after the servowriting is complete, such as during normal operation of the disk drive, the upper edge of the B-burst and the lower edge of the A-burst can be used by the servo, along with the graycoded track-number whose radial center is aligned with the burst edges, to determine the R/W head position when it is in the vicinity of the center of that servo track. If a reader evenly straddles the A-burst and the B-burst, the amplitude of the signals from the two bursts will be approximately equal and the fractional Position-Error Signal (PES) derived from those bursts will be about 0. If the reader is off-center, the PES will be non-zero, indicating that the amplitude read from the A-burst is either greater than or less than the amplitude read from the B-burst, as indicated by the polarity of the PES signal. The position of the head can then be adjusted accordingly. For instance, negative PES might indicate that the amplitude read from the A-burst is greater than the amplitude read from the B-burst. In this case, the head is too far above the center position (using the portion of the pattern in the figure) and should be moved radially downward/inward until the PES signal is approximately 0. It should be noted that for other portions of the pattern a B-burst could be above an A-burst, resulting in a negative amplitude contribution coming from the A-burst. Other burst-demodulation schemes have been proposed which determine the PES as a function of more than two burst amplitudes. Two examples of such schemes are disclosed in U.S. Pat. No. 6,122,133 and U.S. Pat. No. 5,781,361, which examples are incorporated herein by reference. Such schemes would also benefit from the current invention.

Figure 4E:
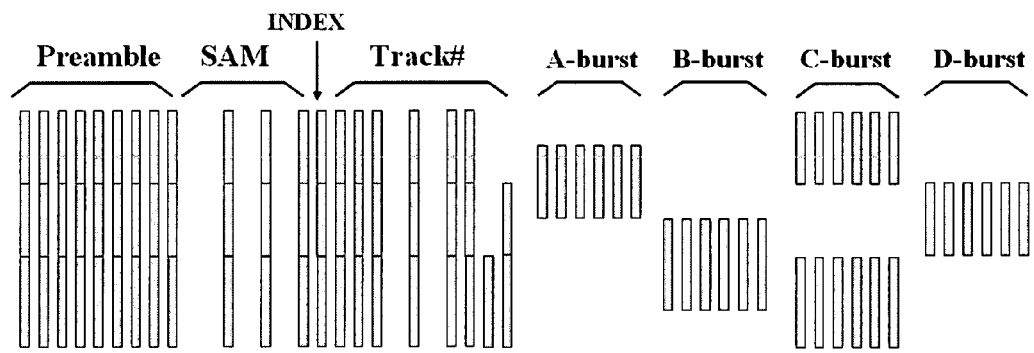
Figure 4F:
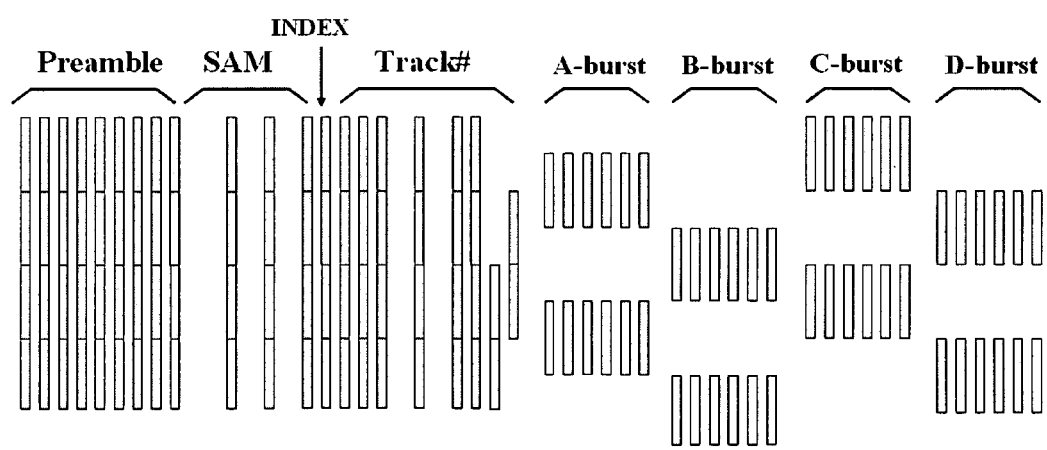

FIGS. 4(e) and 4(f) show the results of subsequent steps of the servowriting process, which has produced a number of servo tracks. After the first step in this process, each subsequent step writes one servo burst in a wedge and trims another. Every second step also writes digital information, including the SAM and track number. Between servowriting steps, the servowriting head is stepped by one-half servo track radially, either toward the inner diameter (ID) or outer diameter (OD) of the disk, depending on the radial direction used to write the servo information. A seek typically takes anywhere from one quarter to one half of the time it takes for the disk to make one revolution. The process of writing the servo pattern for each servowriting step typically takes one full revolution to write all of the wedges for that step. Using this algorithm, then, servowriting can take about 1.25–1.5 revolutions per servowriting step. Since there are two servowriting steps per servo-track in this example, and 1.5 servo tracks per data-track, such a process requires 3 servowriting steps per data-track, or 3.75–4.5 revolutions per data-track. For purposes of subsequent discussion only, it will be assumed that the process takes 4 revolutions per data-track.

A disk drive can have tens of thousands of data tracks. With 100,000 data-tracks and a spin-speed of 5400 RPM (90 Hz), for example, the process would take 4,444 seconds, or about 75 minutes. If the process is carried out on an expensive servowriter, this can add substantially to the cost of the drive. Thus, drive manufacturers are motivated to use self-servowriting techniques to reduce or eliminate the time that a drive must spend on a servowriter.

One such technique uses a media-writer to write servo patterns on a stack of disks. Each disk is then placed in a separate drive containing multiple blank disks, such that the drive can use the patterned disk as a reference to re-write servo patterns on all of the other disk surfaces in the drive, as well as writing a servo pattern on the patterned surface, if desired. The media-writer can be an expensive instrument, and it may still take a very long time to write a reference pattern on the stack of disks. However, if a stack contains 10 blank disks, for example, then the media-writer can write the reference pattern for 10 drives in the time that it would have taken to servowrite a single drive. This scheme is a member of a class of self-servowriting techniques commonly known as "replication" self-servowriting.

A typical replication process, in which a drive servos on the reference pattern and writes final servo patterns on all surfaces, takes place while the drive is in a relatively inexpensive test-rack, connected to only a power-supply. The extra time that it takes is therefore usually acceptable.

Another class of self-servowriting techniques is known as "propagation" self-servowriting. Schemes in this class differ from those in the "replication" class in the fact that the wedges written by the drive at one point in the process are later used as reference wedges for other tracks. These schemes are thus "self-propagating". Typically, such schemes require a R/W head that has a large radial offset between the read and write elements, so that the drive can servo with the read element over previously-written servo wedges while the write element is writing new servo wedges. In one such application, a servowriter is used for a short time to write a small "guide" pattern on a disk that is already assembled in a drive. The drive then propagates the pattern across the disk. In this type of self-servowriting operation, previously written tracks can later serve as reference tracks.

Many of the self-servowriting techniques, including those described above, require considerably more than four disk revolutions per data-track written, as the drive must spend considerable time at the start of each servowriting step determining the written-in runout of the corresponding reference track, so that the servowriting head can be prevented from following that runout while writing the final servo pattern. Techniques exist which allow tracks of servo information to be made substantially circular, despite the fact that the reference information is not perfectly circular.

The information used to remove written-in runout from the track can be calculated, in one approach, by examining a number of parameters over a number of revolutions. These parameters can include wedge offset reduction field (WORF) data values. WORF data can be obtained, for example, by observing several revolutions of the position error signal (PES) and combining the PES with servo loop characteristics to estimate the written-in runout, such as of the reference track. It is also possible to synchronously average the PES, and combine the synchronously-averaged PES with servo loop characteristics to estimate the written-in runout. Various measurements can be made, as are known in the art, to characterize servo loop characteristics. Because the servo typically suffers both synchronous and non-synchronous runout, any measurement intended to determine the synchronous runout will be affected by the non-synchronous runout. If many revolutions of PES data are synchronously averaged, the effects of the non-synchronous runout can lessen, leaving substantially only synchronous runout. This allows better determination of, and subsequent elimination of, the written-in runout. Averaging many revolutions of PES data, however, can add significantly to the time required for determination of the written-in runout. Process engineers may need to balance the cost and benefit of additional revolutions of PES data collection in determination of WORF values.

The computed written-in runout values for each servo wedge can be written into the servo wedges themselves for later use by the servo, or can be kept in drive microcontroller memory for immediate use. During a self-servowriting operation, the drive may use the latter option by calculating the written-in runout on a reference track and applying it to the servo by the use of a table in microcontroller memory. Additional revolutions of PES measurements for the reference track can be used to reduce the effects of non-synchronous, or repeatable, runout.

As previously described, techniques for determining and removing written-in runout of a track will hereinafter be referred to as WORF technology. If, for example, a drive spends 5 revolutions to determine the written-in runout of each reference track before writing the corresponding final wedges, that would add 15 revolutions to the writing time of each data-track (5 extra revolutions per servowriting step, times 3 servowriting steps per data-track), bringing the total time per data-track to 19 revolutions.

Even though the self-servowriting time may be as much as about five times as long as the time necessary to servowrite a drive on a servowriter (19 revolutions/data-track, versus 4 revolutions/data-track), self-servowriting is likely to be a less expensive alternative due to the expense of servowriters, as well as the fact that servowriting operations on a servowriter generally must be performed in a cleanroom environment. Also, as track-densities get higher it becomes more difficult for an external device such as an actuator push-pin to control the position of the R/W heads accurately enough to produce a servo pattern with sufficiently small written-in runout. The expense of servowriting also rises in proportion to the number of tracks on a drive.

FIGS. 4(a)–(f), described above, show an idealized servowriting process in which the radial placement of the writer is virtually perfect during servowriting. In reality, the writer placement will not be perfect, even if the written-in runout of the reference pattern is completely removed, due to non-synchronous positioning errors. There are several sources of non-synchronous runout, which is commonly referred to in the industry as NRRO, or Non-Repeatable Runout. If the servowriting head suffers non-synchronous runout while writing servo wedges, that runout will be written into those wedges.

Figure 5:
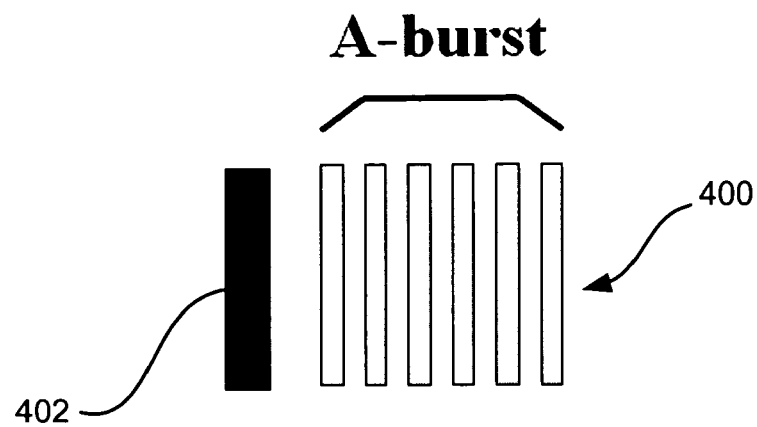
FIGS. 5 and 6 are diagrams of a servo-burst pattern being written over a progression of servowriting steps, wherein there is a head misplacement on the second step.
Figure 6:
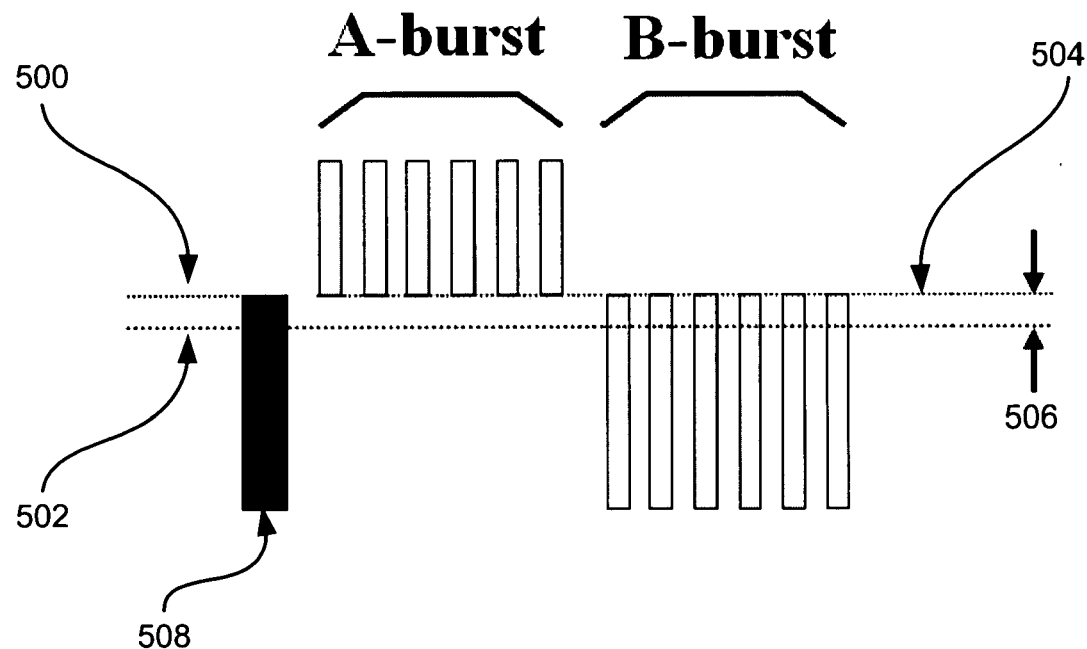

Such a result is illustrated in FIGS. 5 and 6. For the sake of simplicity, only A and B bursts are shown, leaving out the digital information and other bursts. In FIG. 5, the servowriter head 402 in a first servowriting step 400 writes an A-burst. In FIG. 6, the head 508 in a second servowriting step is offset, or mis-placed, a distance from its ideal position. For example, the ideal placement 502 of the top edge of the writer, and therefore the ideal placement of the servo track centerline, is shown a distance from the actual placement 500 of the top edge of the writer 508. This separation is the written-in runout 506.

Figure 8:
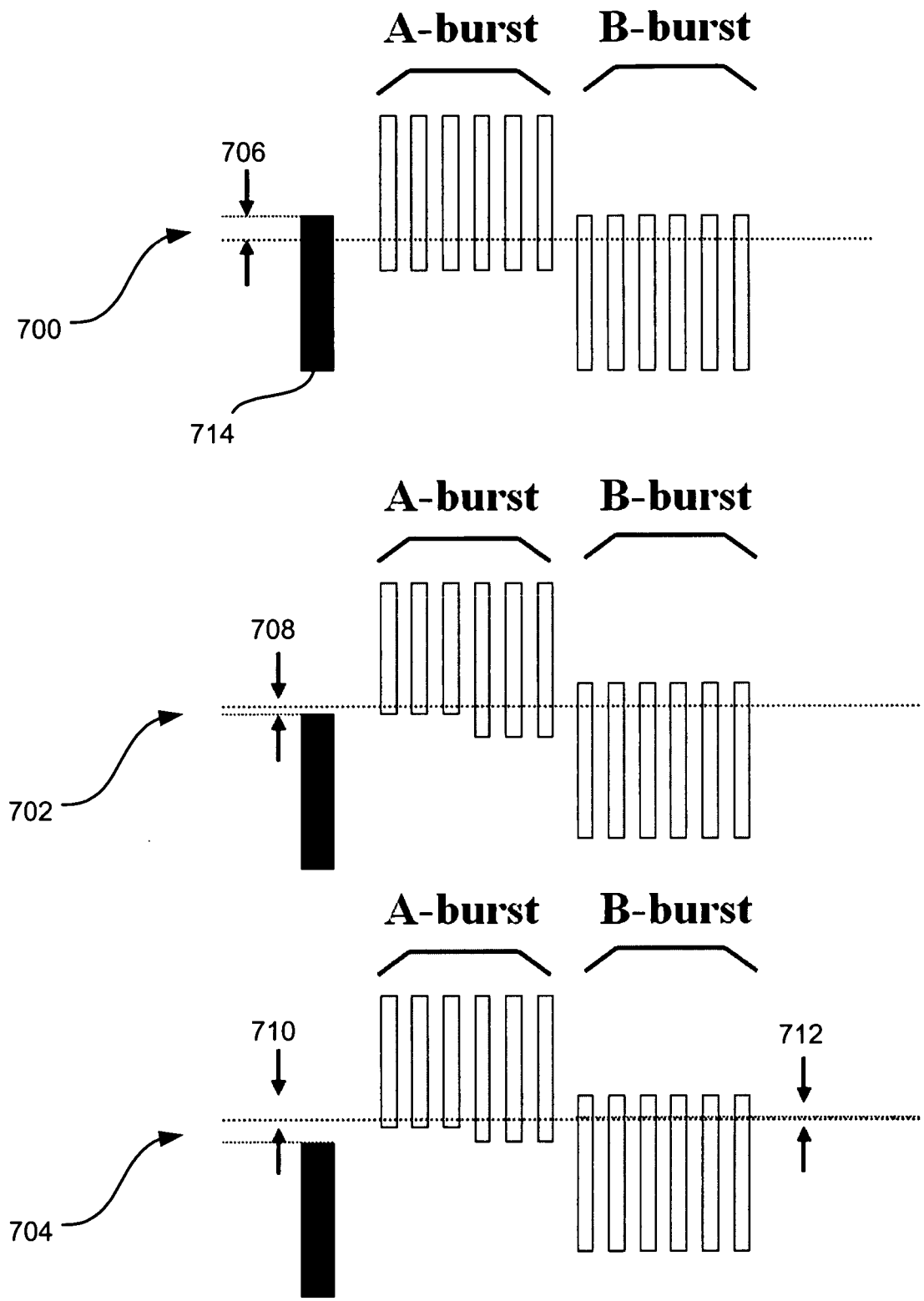
FIG. 8 is a diagram of a servo-burst pattern being written over a progression of servowriting steps using multiple passes in accordance with a second embodiment of the present invention.

An algorithm such as a typical quadrature servo detection algorithm can be used to determine the fractional track position of the R/W head by comparing the amplitudes of two bursts that are 180 Degrees out of phase with one another, such as the A-burst and B-burst in FIG. 8. Because existing servowriting processes involve trimming the A burst at the same time the B burst is written, any mis-placement of the writer during that revolution will result in equal mis-placement of their common edges. The written-in runout of that wedge, or the mis-placement of the center of the servo track, therefore will be equal to the mis-placement suffered by the writer at the time of writing of the wedge. If the only runout suffered by the writer is NRRO (i.e., if the written-in runout of the reference wedges is completely eliminated by the use of WORF technology), then the Root-Mean-Square (RMS) written-in runout will be equal to the RMS NRRO suffered by the writer during the servowriting process.

Figure 7:
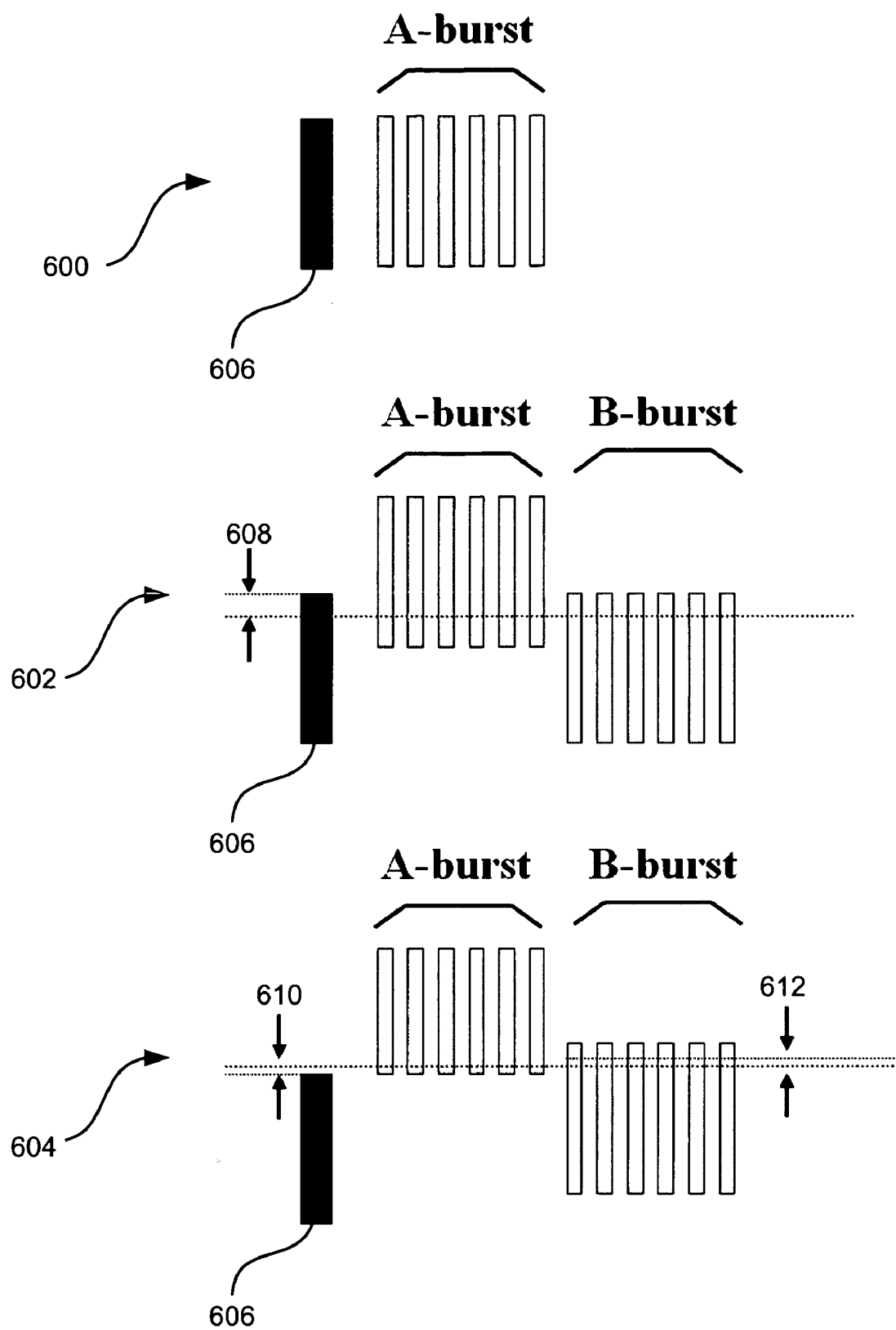
FIG. 7 is a diagram of a servo-burst pattern being written over a progression of servowriting steps using multiple passes in accordance with one embodiment of the present invention.

FIG. 7 depicts a process in accordance with one embodiment of the present invention by which the RMS written-in runout can be substantially reduced, at the cost of an extra revolution of the disk for each servowriting step. For such a servowriting operation, the writing of the B burst and the trimming of the A burst occur on separate revolutions of the disk (i.e., on separate passes) with the A burst and the B burst having a substantially common edge as an exactly common edge is generally impractical. The mis-placement of the upper edge of the B burst and the lower edge of the A burst, each of which are determined by the mis-placement of the writer during the corresponding revolutions of the disk, are quasi-independent random variables. If the runout suffered by the writer is indeed non-synchronous (NRRO), then the mis-placements of those two burst edges should not be the same from one revolution to the next. The mis-placement of the centerline of the servo track will be equal to the average of the misplacement of the upper edge of the B-burst and the lower edge of the A-burst.

For example, in the first servowriting step 600 of FIG. 7 the head 606 writes an A-burst. In a first pass of the second servowriting step 602, the head 606 writes a B-burst. The head is displaced a first distance 608 when writing the B-burst. In a second pass of the second servowriting step 604, the head is displaced a different distance 610 from the expected position when trimming the A-burst, leaving a smaller written-in runout 612 than would have occurred had the A-burst been trimmed and the B-burst written in a single pass of the second servowriting step 602 (which would have been approximately equal to the misplacement 608 on that pass). The A-burst also could have been trimmed before writing the B-burst.

It is well known that the average of two un-correlated random variables of RMS magnitude, $r_0$, as well as a mean value of zero, has an RMS magnitude of:

$$r_0/\sqrt{2}.$$

Whether or not the two misplacements are truly un-correlated depends upon the spectrum of the NRRO. Very low frequency NRRO components may have some correlation from revolution to revolution, but most NRRO components can be essentially un-correlated from one revolution to the next. Thus, by spending one extra revolution for each servowriting step, the servowriting process can achieve about a 29% reduction in the resulting written-in runout.

This approach can be extended, as shown in FIG. 8. On a second servowriting step 700, in which a B-burst is written, the head 714 has a first mis-placement 706. At the cost of yet another revolution, the trimming of the A burst can be done in two separate revolutions, trimming half of the burst in each revolution. On a second pass of the second servowriting step 702, half of the A-burst is trimmed with a second mis-placement 708. On a third pass of the second servowriting step 704, the other half of the A-burst is trimmed with a third mis-placement 710. The written-in runout 712 is then even smaller when three mis-placements are averaged. The track centerline being determined by the un-correlated writer misplacement over three separate revolutions can result in an additional reduction in written-in runout of about 13%. The concept can be further extended by trimming the A-burst in additional passes, such as by trimming a third of the A-burst in each of three passes.

The written-in runout also can be reduced by writing the B-burst in multiple passes, if the servowriting system is capable of writing magnetic transitions with very high timing coherence from revolution to revolution (i.e., it is capable of lining up the transitions from two separate revolutions very accurately). For example, the B-burst can be written by writing a third of the burst in each of three separate passes. The writing passes and trimming passes can involve doing all the writing then all the trimming, all the trimming then all the writing of new bursts, or alternating trimming and writing. If the separate portions of the B-burst are not circumferentially lined up very accurately, though, a burst-amplitude demodulation scheme could give an inaccurate measurement of the overall amplitude of the burst, and can actually increase the written-in runout. If the B-burst were to be split into two separate B-bursts, with each being demodulated separately and the amplitudes being averaged, then this would not be a problem. This could require a servo detection system that can accommodate more bursts, as well as additional overhead on the disk for the necessary space between the sub-bursts. If the techniques shown in FIG. 7 or 8 are used, there is no need for extremely high coherency in servowriting.

If the embodiment depicted in FIG. 7 is applied to a standard servowriting operation done on a servowriter, one extra revolution per servowriting step is required. With three servowriting steps per data-track, this will nearly double the time spent on a servowriter, jumping from four revolutions per data-track to seven. This is likely to be an unacceptable cost for most applications. If the same innovation is applied to a self-servowriting operation as described above, however, the relative increase in servowriting time is much smaller. Since the self-servowriting time is already nineteen revolutions per data-track, an additional three revolutions adds only about 16% to the self-servowriting time, which is much less expensive than servowriter time.

If the procedure depicted in FIG. 8 is applied to a servowriter or media-writer operation, the time will be 150% greater than the standard servowriter time, taking into consideration the original four revolutions per data track plus three additional revolutions for each of the two separate erases. In the self-servowriting case, the additional six revolutions per data-track add only about 32% to the time. While such a technique may add an unacceptable cost to a servowriter or media-writer process, the process may add an acceptable cost to a self-servowriting process.

Figure 9:
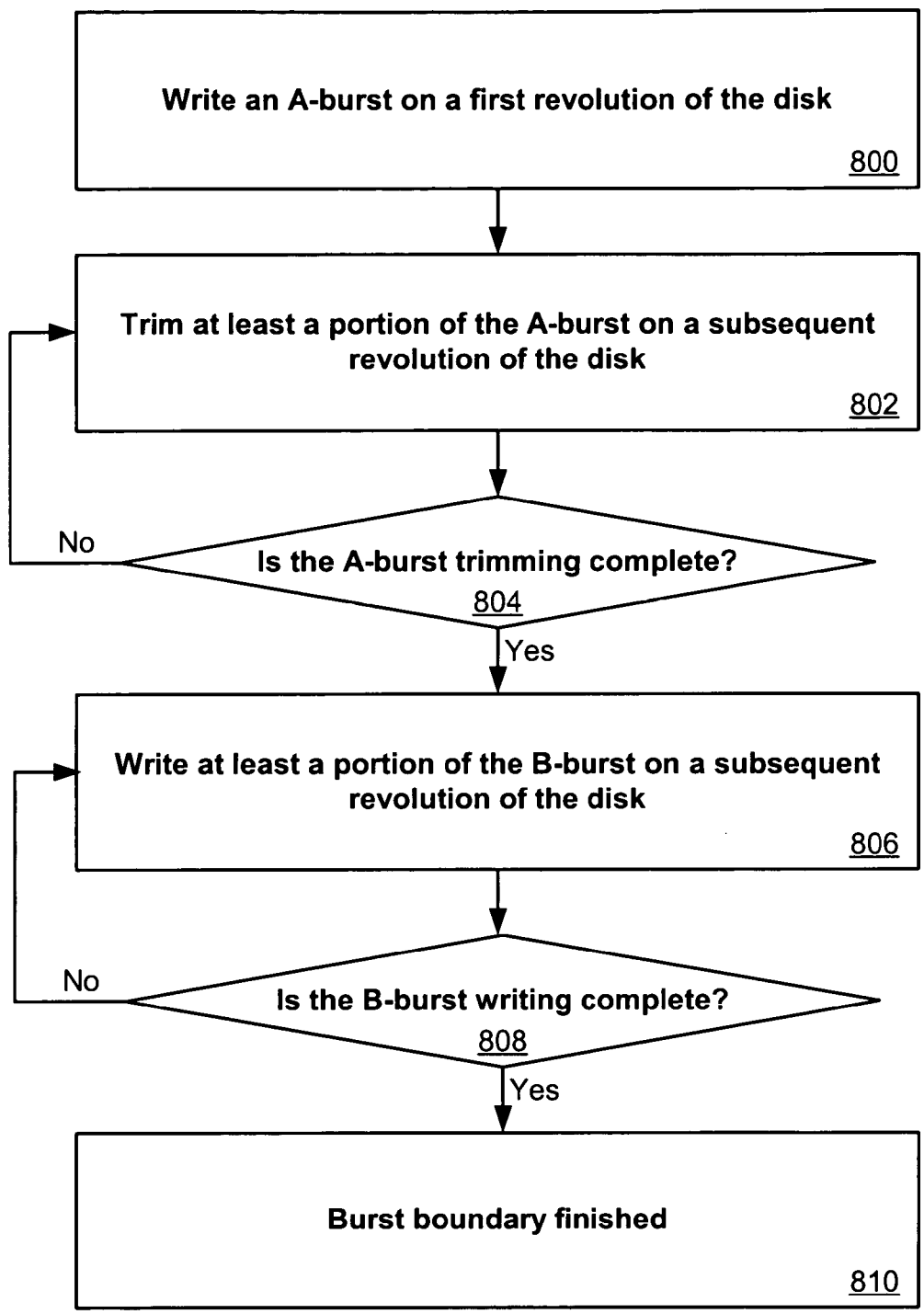
FIG. 9 is flowchart for a method that can be used with to write the patterns of FIGS. 7 and 8.

FIG. 9 shows a method that can be used in accordance with one embodiment of the present invention. In this exemplary method, the writing of an A-burst/B-burst boundary is described. It should be understood that the method can be used with any set of bursts in any order. In this method, an A-burst is written on a first revolution of a disk 800 upon which a servo pattern is to be written. At least a portion of the A-burst is trimmed on a subsequent rotation of the disk 802. If the A-burst is not completely trimmed 804, step 802 can be repeated until the entire A-burst is trimmed. At least a portion of the B-burst for the given burst boundary can be written on a subsequent revolution 806. If the B-burst is not completely written 808, step 806 can be repeated until the entire B-burst is written. The writing and trimming of the burst boundary is then complete 810. It should be understood, however, that steps 802–808 can be done in any reasonable order. For example, steps 806 and 808 for writing the B-burst can occur before steps 802 and 804 for trimming the A-burst. It is also possible to intersperse the writing of the B-burst with the trimming of the A-burst, such that you could write the A-burst, write at least a portion of the B-burst, trim at least a portion of the A-burst, then write another portion of the B-burst.

Although embodiments described herein refer generally to systems having a read/write head that can be used to write bursts on rotating magnetic media, similar advantages can be obtained with other such data storage systems or devices. For example, a laser writing information to an optical media can take advantage of additional passes when writing position information. Any media, or at least any rotating media, upon which information is written, placed, or stored, may be able to take advantage of embodiments of the present invention.

The foregoing description of preferred embodiments of the present invention has been provided for the purposes of illustration and description. It is not intended to be exhaustive or to limit the invention to the precise forms disclosed.

Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A system for writing position information to a rotating medium, comprising:
   a rotatable medium capable of storing information written to the rotatable medium;
   a write element capable of writing information to the rotatable medium; and
   a control mechanism adapted to rotate the rotatable medium and position the write element relative to the rotatable medium, such that the write element can:
   write a first servo burst during a first servowriting step of the write element over the rotatable medium;
   trim the first servo burst during a first pass of a second servowriting step of the write element; and
   write a second servo burst during a second pass of the second servowriting step of the write element, wherein the first servo burst and second servo burst each have a substantially common edge that can be used to determine the position of the write element during a subsequent pass over those servo bursts; wherein the second servo burst can be written before the first servo burst is trimmed.

2. A system according to claim 1, wherein:
   the rotatable medium is selected from the group consisting of magnetic disks, optical disks, and laser-recordable disks.

3. A system according to claim 1, wherein:
   the first servo burst and second servo burst each have an edge that is positioned approximately along a track line, the track line extending circumferentially about the disk.

4. A system according to claim 1, further comprising:
   a read element adapted to read the first servo burst and second servo burst on a subsequent pass over the rotatable medium.

5. A system according to claim 4, further comprising:
   a read/write head containing the read element and the write element.

6. A system according to claim 5, further comprising:
   read circuitry adapted to accept information from the read element and determine the position of the read/write head.

7. A system according to claim 1, wherein:
   the write element is further adapted to trim the first servo burst to have a width approximately equal to the width of a track of servo data.

8. A system according to claim 1, wherein:
   the write element is adapted to write the first and second servo bursts in a servo wedge on the rotatable medium.

9. A system according to claim 1, wherein:
   the write element executes the second pass of the second servowriting step before the first pass of the second servowriting step.

10. A system for writing position information to a magnetic disk, comprising:
    a magnetic disk capable of storing information written to the magnetic disk;
    a write element capable of writing information to the magnetic disk; and
    a control mechanism adapted to rotate the magnetic disk and position the write element relative to the magnetic disk, such that the write element can:
    write a first servo burst during a first servowriting step of the write element over a magnetic hard disk;
    trim the first servo burst during a first pass of a second servowriting step of the write head, the first servo burst being trimmed so as to have a trimmed edge in about a predetermined position on the magnetic disk; and
    write a servo burst during a second pass of the second servowriting step of the write head, wherein the trimmed edge of the first servo burst and an adjacent edge of the second servo burst define a position that can be used to adjust the radial location over the disk of the write head during subsequent passes over those bursts; wherein the second servo burst can be written before the first servo burst is trimmed.

11. A system for writing position information to a magnetic disk, comprising:
    means for writing a first servo burst during a first servowriting step of a write head over a magnetic hard disk;
    means for trimming the first servo burst during a first pass of a second servowriting step of the write head, the first servo burst being trimmed so as to have a trimmed edge in about a predetermined position on the magnetic disk; and
    means for writing a servo burst during a second pass of the second servowriting step of the write head, wherein the trimmed edge of the first servo burst and an adjacent edge of the second servo burst define a position that can be used to adjust the radial location over the disk of the write head during subsequent passes over those bursts; wherein the second servo burst can be written before the first servo burst is trimmed.

12. A system for writing position information to a rotating medium in order to reduce repeatable runout, comprising:
    a rotatable medium capable of storing information written to the rotatable medium;
    a write element capable of writing information to the rotatable medium; and
    a control mechanism adapted to rotate the rotatable medium and position the write element relative to the rotatable medium, such that the write element can:
    write a first servo burst during a first servowriting step of the write element over the rotatable medium;
    trim the first servo burst during a first pass of a second servowriting step of the write element; and
    write a second servo burst during a second pass of the second servowriting step of the write element, wherein the first servo burst and second servo burst each have substantially common edge that can be used to determine the position of the write element in order to reduce repeatable runout; wherein the second servo burst can be written before the first servo burst is trimmed.

13. A method for writing position information to a rotating medium, comprising:
    writing a first servo burst during a first servowriting step of a write element over a rotating medium;
    trimming the first servo burst during a first pass of a second servowriting step of the write element; and
    writing a second servo burst during a second pass of the second servowriting step of the write element, wherein the first servo burst and second servo burst each have a substantially common edge that can be used to determine the position of the write element during a subsequent pass over those servo bursts; wherein the second servo burst can be written before the first servo burst is trimmed.

14. A method according to claim 13, further comprising:
using the trimmed edge of the first servo burst and an adjacent edge of the second servo burst to determine the position of the write element.

15. A method according to claim 13, including at least one of:
having the width of the first servo burst after trimming be approximately the width of a track of servo data;
containing the first and second servo bursts in a servo wedge on the rotating medium;
having the trimmed edge of the first servo burst and an adjacent edge of the second servo burst define the position of a centerline of a data track on the rotating medium; and
having the second pass of the second servowriting step occur before the first pass of the second servowriting step.

16. A method for writing servo information to a magnetic disk, comprising:
writing a first servo burst during a first servowriting step of a write head over a magnetic hard disk;
trimming the first servo burst during a first pass of a second servowriting step of the write head, the first servo burst being trimmed so as to have a trimmed edge in about a predetermined position on the magnetic disk; and
writing a servo burst during a second pass of the second servowriting step of the write head, wherein the trimmed edge of the first servo burst and an adjacent edge of the second servo burst define a position that can be used to adjust the radial location over the disk of the write head during subsequent passes over those bursts; wherein the second servo burst can be written before the first servo burst is trimmed.

17. A method for writing position information to a rotating medium in order to reduce repeatable runout, comprising:
writing a first servo burst during a first servowriting step of a write element over a rotating medium;
trimming the first servo burst during a first pass of a second servowriting step of the write element; and
writing a second servo burst during a second pass of the second servowriting step of the write element, wherein the first servo burst and second servo burst each have a substantially common edge that can be used to determine the position of the write element in order to reduce repeatable runout; wherein the second servo burst can be written before the first servo burst is trimmed.

* * * * *